June 24, 1969  W. H. SUTTER ET AL  3,451,544
GRAIN DOOR KIT FOR TRANSPORT VEHICLES
Filed Aug. 8, 1967
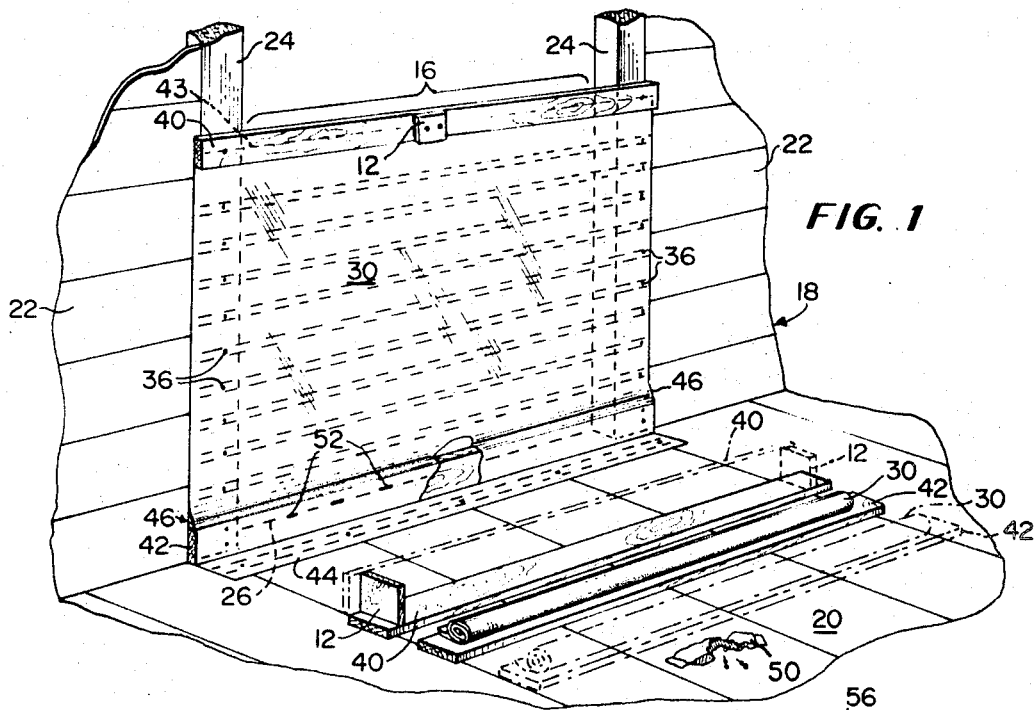
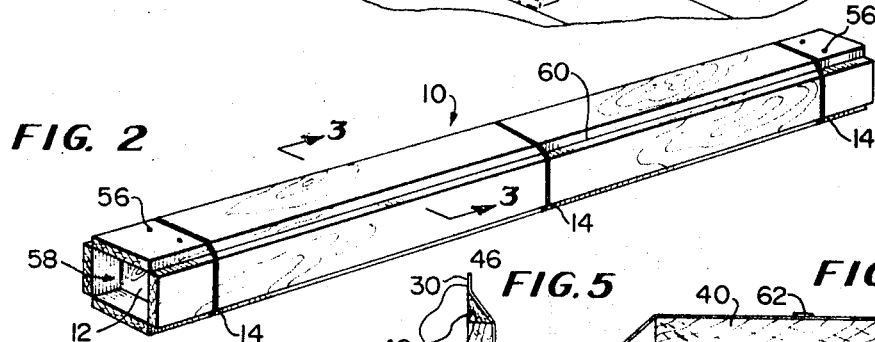
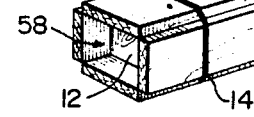
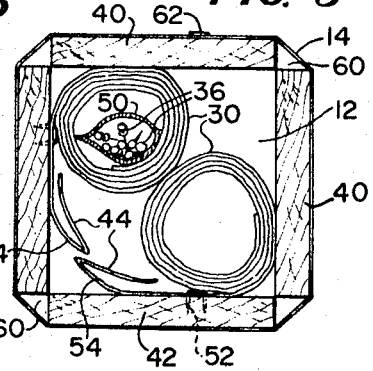
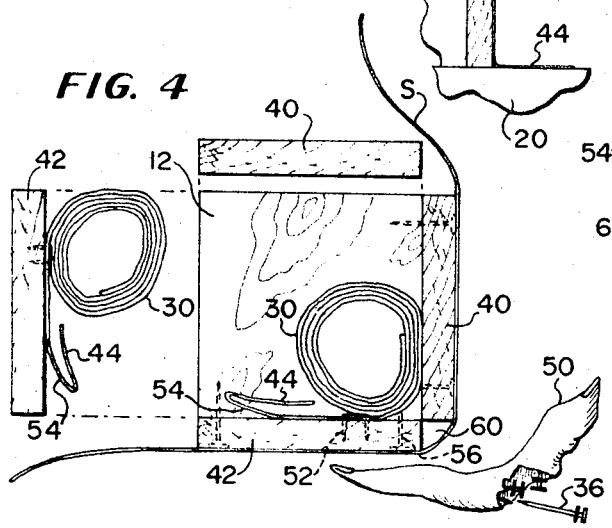
INVENTORS:
WARREN H. SUTTER
DONALD F. KRAMER
By Edward R. Lowndes

United States Patent Office
3,451,544
Patented June 24, 1969

3,451,544
GRAIN DOOR KIT FOR TRANSPORT VEHICLES
Warren H. Sutter, Chicago, Ill., and Donald F. Kramer, Appleton, Wis., assignors to Signode Corporation, Chicago, Ill., a corporation of Delaware
Filed Aug. 8, 1967, Ser. No. 659,062
Int. Cl. B65d 85/62
U.S. Cl. 206—65     3 Claims

ABSTRACT OF THE DISCLOSURE

A grain door kit embodying all of the components of two grain door installations for a railway freight car or the like. The kit components include two paperboard grain doors separately coiled and attached to respective pry-boards, and two climb-out boards, together with a package of nails. The four boards are arranged in quadrilateral fashion to provide a tubular box-like enclosure for the doors and nails, while a pair of end cleats inside the enclosure afford the necessary reaction to enable the four boards to be held in position by tensioned strapping.

---

The present invention relates to temporary closure panel installations for the door openings of railway freight cars, specifically freight cars having either metal or wooden door posts at the sides of such openings and to which posts temporary flexible closure panels are nailed to seal the openings against the egress of bulk material such as grain or the like. More specifically the invention is concerned with a novel, compact package-type kit which includes all of the components necessary for the installation of a pair of such temporary closures in a freight car, one for each of the two door openings ordinarily assciated with such a vehicle.

It has long been the practice in connection with the side door openings of a railway freight car to seal such opening against the escape of granular materials such as grain, salt, silica sand, fertilizers and the like by nailing a flexible and disposable closure panel to the door posts at the sides of the openings so that the panel extends across the opening on the inner side thereof and, in addition to its sealing function, prevents the contents of the freight car from hindering the normal operation of the regular outside sliding door of the car. Such flexible closure panels are ordinarily referred to as "grain doors," and they will be thus referred to both in this specification and in the appended claims. Such grain doors are comprised of a two-ply laminated sheet or panel, the laminations of which are formed of heavy kraft or corrugated paper, between which there are disposed a plurality of vertically spaced, horizontally extending, steel straps having longitudinally spaced holes therein. These holes are adapted for selective reception of nails by means of which the panel may be nailed to the door posts. The straps thus reinforce and prevent tearing of the paper in the vicinity of the nails and they also reinforce the panel as a whole against undue outward bulging when the freight car is fully loaded and in transit. The outer side of one of the two laminations usually is waxed for waterproofing purposes. An asphaltic or other bonding material is interposed between the two laminations, thus lending substance to the panel as a whole. To reinforce the top and bottom edges of the flexible sheet or panel, it is invariably the practice to nail two wooden boards horizontally across the door opening. The lower of these two boards is commonly referred to as the "pry-board" and it is nailed directly to the door posts and seats upon the floor surface, after which the flexible panel is nailed to the inside face of this board in such a manner that a lower end region of the panel overlaps this board and affords a narrow flap which is nailed to the car floor. The upper board is commonly referred to as the "climb-out" board since, after both grain doors have been installed, it is necessary for the workman to climb over one or the other of the two upper boards to leave the freight car enclosure. This upper board is nailed to the door posts and, when so nailed, has its upper edge exposed above the upper horizontal edge of the panel.

From the above brief description it will be appreciated that the installation equipment for accommodating a single two door freight car consists of two flexible panels, four pre-cut boards of predetermined length, width and thickness, and a supply of nails. It will be understood that an impact tool such as a carpenter's hammer will be the only tool necessary for the operator to make the dual door installation. An additional requisite item for effective grain door installation is a supply of compressible material capable of being matted so that it is possible for the workman to seal the triangular openings or voids which are left at the lower corners of the grain door installation incident to the overlay of the flexible panel on the pry-board where it extends from the inside face of the board to the first or adjacent steel strap associated with the panel. A supply of paper is usually kept on hand for this purpose.

In the large-scale loading of a string of freight cars considerable manual activity and other effort has heretofore been required. It will be understood, of course, that the empty freight cars of a string of cars are brought one at a time successively to a grain door installation station where the doors are applied, after which they are moved to the loading station. At the installation station it has been the practice to maintain in stacked relationship a large supply of lumber in the form of pre-cut pry-boards and climb-out boards, these ordinarily consisting of pieces of 1" x 6" stock cut in eight foot lengths. The flexible grain door panels ordinarily are supplied in stacked folded and strapped relationship, ten door panels to a package, and therefore a large number of such packages must be maintained on hand at the installation station. Additionally a supply of nails in bulk and a quantity of the paper caulking material must be acquired and maintained available.

For each installation that is made, it is necessary to select for installation purposes four of the boards and place them in the car enclosure, after which two of the flexible panels must be detached from a package of such panels and also placed in the enclosure, this necessitating cutting the straps, from time to time, that bind the package of panels together and removing the outer carton covering. The workman then enters the car enclosure and commences the actual installation operation.

Apart from the large amount of manual effort required in the installation of grain doors according to present day procedure, satisfactory and square grain door installation is not always uniformly attained. Where out-of-square conditions are extreme, it may happen that a nail falling close to an edge of the door post, will split the post when it is driven home. Additionally, the presence of fold lines or creases in the grain door panel packages, as previously described, presents a serious limitation in the erection of the grain doors, as well as contributing to the inefficiency of such doors after they have been erected. Due to the presence of asphaltic material between the two laminations of each panel, the fold lines or creases formerly present therein are more or less permanent. The unfolding of these creases, especially in cold weather, preparatory to grain door erection leads to the presence of incipient cracks in the panels so that after door erection, the parallelogram type stresses that are applied to the panel from the door posts by reason of sudden acceleration and deceleration of the freight car will open up such cracks with a consequent loss of the granular material.

Finally, where open or outdoor grain door installation stations are involved, inclement weather is a hazard to the stacked or stored materials involved and much moisture is carried or tracked into the freight car enclosure. Exposure to moisture has a tendency to warp the raw pine lumber which is employed for the pry-boards and the climb-out boards in the interest of economy.

The present invention is designed to overcome the above-noted limitations that are attendant upon present grain door installation procedure and, toward this end, the invention contemplates the provision of a novel grain door kit or package which embodies all of the necessary components for a complete freight car grain door installation, i.e. for sealing the two door openings of a freight car, the kit thus including four lengths of board stock which are pre-cut to the proper dimensions so that they may serve as the two required pry-boards and the two required climb-out boards, two flexible panels, a supply of nails in substantially the required amount, and a quantity of caulking or stuffing material adequate to seal the aforementioned openings which are left after the panels and lumber have been applied to the door posts. The novelty of the present invention is not in the inclusion in the package of the necessary grain door components, but rather it resides in the novel manner in which these components are assembled to provide the package, the arrangement being such that all of the components which cooperate to make up the package are operative elements of the dual grain door installation.

One of the principal advantages of the present grain door kit resides in the fact that the four properly dimensioned pre-cut boards are assembled in rectilinear fashion upon one another to provide an elongated outer protective tubular container for the remaining components of the two grain doors. By such an arrangement collective packaging of the grain door panels in paperboard containers as heretofore outlined is eliminated. The kit also includes a pair of end cleats which, in combination with the pry-boards and climb-out boards, establish a wooden box-like structure which encloses the remaining components of the kit. Additionally, since the four boards afford an extremely rigid and impenetrable enclosure for the two paper door panels, the use of conventional handling hooks may safely be resorted to without damage to the door panels. Outdoor storage of the complete assembled kits does not subject the lumber to the usual warping processes which take place when the boards are completely exposed to the weather since the steel straps which hold the boards in their juxtapositioned relationship inhibits such warping, all in a manner that will become clear when the nature of the invention is better understood.

Another and important advantage of the invention resides in the fact that the two door panels are separately coiled to provide two rolls within the confines of the outer wooden shell or container afforded by the four rectilinearly arranged boards, the rolls being coiled so that the waxed sides thereof are presented circumferentially outwardly of the rolls, and being disposed in contiguous tangential relationship within the confines of the board enclosure. By such an arrangement, a two-fold advantage is attained. In the first place no folds are present in the door panels which otherwise would result in splits in the erected panel structure and, secondly, infiltration of moisture into the interior of the rolls is inhibited.

An additional advantage of the invention is predicated upon the fact that one of the two rolls which comprise the two flexible door panels has enclosed therein a flexible container or bag containing substantially the exact number of nails required for nailing the panels to the associated door posts of the freight car. The material from which the bag is formed is of a soft flexible compressible nature so that after the bag has been broken open and the nails removed, it may be readily torn apart manually into four sections which may then be individually matted and stuffed into the aforementioned triangular voids which exist at the lower corners of the installation after the boards and panels have been nailed in position.

Yet another advantage of the invention arises from the provision of a pair of identical novel sub-assemblies which comprise the principal components of the kit. Each of these sub-assemblies is made of one of the flexible door panels in its rolled condition and one of the four boards which is secured to the door panel and prepositioned thereon so that when the panel is uncoiled for purposes of application to the door posts, the board will function as the pry-board for the application. By this arrangement, not only is a certain amount of nailing eliminated during actual setting up operations but additionally squaring-up operations are facilitated since the nailing of the pry-board initially in position at the base of the door opening will automatically square up or properly orient the panel itself and its integral floor flap with respect to the door opening and the door side posts.

Apart from the several functional or operational advantages associated with actual grain door erection procedures, certain structural advantages are present in connection with the completely assembled package or kit. One of these arises from the fact that jig or bench assembly operations at the factor are facilitated. The details of such kit assembly operations will be set forth subsequently when the nature of the invention is better understood. Another structural advantage arises from the fact that in initially assembling the two panel-attached pry-boards and the two free climb-out boards in their rectilinear relationship, square corners are avoided in the overall box-like wooden structure. Instead the four boards are lightly "tacked" with nails to a pair of square wooden end pieces so that the inside edges of adjacent boards register with each other, thus giving a truncated corner effect to the box-like structure as a whole. Stated otherwise, the four boards, when completely assembled on one another assume a corner-to-corner relationship as distinguished from the usual edge-to-edge relationship where four boards are nailed together in rectilinear fashion to establish a rectangular tubular construction. Since this corner-to-corner quadrilateral structure is ultimately strapped at both ends and in the middle thereof by steel strapping which is applied by a commercial strap tensioning device under fairly high tension, the strapping material passes around the truncated corners of the structure with 45° changes in direction as distinguished from the usual 90° change in direction. In this manner, strap tension will not readily crush or deform the corners nor split the relatively fresh low-grade expendable pine lumber which ordinarily is employed in the interests of economy.

The provision of a grain door package or kit which is comprised of relatively few extraneous parts not actually employed in the erection of the two grain doors of a railway freight car; one which is capable of ease of assembly at the factory without requiring the use of skilled labor and which, similarly is capable of ease of dismantling for purposes of grain door erection in the field; one which is rugged and durable and will withstand rough usage; one which is easily handled, either individually or in quantity; as for example by the use of conventional lift trucks; one which is economical both from the standpoint of manufacture and use; one which is extremely compact so that a large number thereof may conveniently be stored in a small space; and one which, otherwise, is well adapted to perform the services required of it, are further desirable features which have been borne in mind in the production and development of the present invention.

Other objects and advantages of the invention, not at this time enumerated, will readily suggest themselves as the following description ensues.

In the accompanying single sheet of drawings forming a part of this specification, one illustrative embodiment of the invention has been shown.

In these drawings:

FIG. 1 is a fragmentary perspective inside view of one of two grain door installations associated with a freight car and showing the grain door of the present invention in the process of use;

FIG. 2 is a perspective view of the completely assembled kit;

FIG. 3 is an enlarged sectional view taken transversely through the kit, the view being taken on the vertical plane indicated by the line 3—3 of FIG. 2 and in the direction of the arrows;

FIG. 4 is an exploded sectional view conforming to the disclosure of FIG. 3 and illustrating the manner of bench asssembly of the kit; and FIG. 5 is an enlarged fragmentary sectional view taken on the vertical plane indicated by the line 5—5 of FIG. 1 and in the direction of the arrows.

Referring now to the drawings in detail, a grain door kit constructed and assembled in accordance with the principles of the present invention has been illustrated in FIG. 2 and designated in its entirety at 10. Except for the inclusion in this kit of a pair of wooden end cleats 12 and three encircling loops or bands 14 of steel or other strapping material, the kit embodies all of the components and materials requisite to the installation of two conventional grain doors across the two door openings of a railway freight car.

Before entering into a description of the nature of the grain door kit 10, it is deemed essential for a better understanding of the advantages offered by the kit to set forth in detail the nature of a conventional grain door installation and the manner in which it ordinarily is erected. Accordingly, in FIG. 1 such an installation has been shown in connection with one of the two door openings 16 associated with a railway boxcar, a portion of which has been shown at 18. The boxcar is provided with the usual floor or deck 20 and side panelling 22, the panelling on only one side of the boxcar being shown. A rectangular door frame including vertical door posts 24, a lower sill 26, and an upper sill (not shown) establishes the aforementioned door opening 16. This door opening is adapted to be closed by the usual outside sliding door (likewise not shown).

The grain door installation shown in FIG. 1 involves in its general organization a flexible laminated sheet or panel 30, within which there are disposed a plurality of vertically spaced, horizontally extending steel straps 32 having longitudinally spaced holes 34 formed in the end regions thereof. These holes are provided for the purpose of receiving dual-headed nails 36 by means of which the flexible panel 30 may be secured to the door posts 24. Plural spaced holes are provided in order to accommodate door openings of varying widths.

The panel 30 is preferably formed of two laminations of heavy kraft paper, the outer side of one lamination being waxed and such side being installed so that it faces outwardly of the door opening. The straps thus reinforce the flexible panel and prevent the paper sheet from bulging outwardly under the outward thrust of the granular or other load undergoing shipment. The straps also reinforce the paper material in the immediate vicinity of the nails 36 and prevent tearing or ripping of the sheet when tension is applied thereto under the influence of the load.

The upper and lower edge portions of the paper sheet are reinforced with wooden backing strips 40 and 42, these strips being nailed in position across the opening 16 in a manner similar to the nailing of the grain door proper. The upper strip (which commonly is referred to as the climb-out board) is disposed on the inner side of the grain door and overhangs the upper edge 43 of the door panel, while the lower strip (which commonly is referred to as the pry-board) is disposed on the outside of the door. This upper climb-out board is sometimes used as a support for the usual loading spout. A suitable C-clamp type of device being employed for securing the spout in position on the climb-out board. A narrow bottom flap 44 projects laterally and inwardly from the main body of the sheet and closely overlies the adjacent portion of the wooden deck 20 to which it is secured by nails 36. Since the paper sheet 30 traverses the inside face of the lower strip 40, and is stretched over the face of the strip during the installation procedure, small triangular voids 46 are created where the sheet 30 spans the distance between the upper inside corner edge of the strip 40 and the next adjacent reinforcing strap 32 where nailing to the door posts 24 takes place. These triangular voids are stuffed with special twisted caulking paper, but in the present instance where the installation is made entirely from the materials supplied by the kit 10, the caulking material 48 is supplied within the kit as will be set forth in greater detail presently.

In the installation of the above described grain door across the opening 16, square application thereof is essential, especially with a panel having a transverse dimension which only slightly exceeds the width of a standard grain door opening. Otherwise full door opening coverage is not assured. In the usual installation of the grain door, a considerable degree of skill is required to attain such squareness of door installation.

Considering now the grain door kit 10 of the present invention wherein all of the components for the erection of two grain doors in a single freight car are embodied, reference to FIGS. 2 and 3 will reveal the fact that the kit is in the form of a steel-strapped box-like package of elongated rectangular design wherein the two pry-boards 42 and the two climb-out boards 40 are arranged in quadrilateral relationship to constitute an outer composite tubular wooden shell or casing, the ends of which are closed by the aforementioned cleats 12, and within which there are disposed the two kraft paper sheets 30 or grain doors proper. Also enclosed within the casing is a supply of dual-headed nails 36, the latter being enclosed within a flexible paper bag or fibrous container 50 of elongated design. The material which comprises the container 50 is capable of being easily torn in pieces and matted so that the material may be stuffed into the triangular voids 46 for sealing purposes. The two sheets 30 are individually coiled or rolled to involute tubular form as shown in FIG. 3 and they are disposed in diametric tangential relationship within the outer wooden casing. The flexible container 50 is disposed within one of the two rolled sheets 30. The outermost convolution of each sheet, where it emerges from the roll, is secured by impact fasteners such as staples 52 to the inside face of one of the two pry-boards 42 and sufficient excess or loose paper material is left as indicated at 54 to complete the covering of the pry-board so as to establish the floor flap 44 when the grain door installation is made.

As previously described, the four boards which comprise the outer casing are of substantially the same dimensions and the length thereof is somewhat longer than the effective width of the coiled sheets 30. The boards 40 and 42 are positioned in face-to-edge relationship against the two cleats 12, the latter being substantially of square configuration and being disposed inwards of the extreme ends of the casing so as to establish a pair of shallow end pockets 58 which facilitate handling of the kit for lifting purposes, as well as facilitating knock-down or dismantling procedure when the kit is opened initially for access purposes. The distance between the two cleats 12 preferably is equal to or slightly greater than the length of the rolled sheets so that there will be no appreciable end play of the latter within the kit during handling and shipment thereof. If desired, all of the boards 40 and 42 may be secured by nails such as are shown at 56 in FIG. 3 to the cleats 12 but, to facilitate bench assembly operations as will be set forth in detail subsequently, only two of the boards are so nailed, the other two boards being simply placed in position and the binding tension in the bands 14 of strapping material being relied upon to maintain these latter boards in position in the completely assembled kit. It is within the purview of the present invention to entirely omit any nailing of the boards 40 and 42 to the cleats if desired.

It is to be particularly noted that in the quadrilateral arrangement of the four boards 40 and 42, the two transverse dimensions of the square cleats 12 are equal to the transverse dimensions of the various boards so that when the boards are positioned on the cleats the inside corner edges of the boards are contiguous as clearly shown in FIGS. 2 and 3, thus leaving four triangular recesses 60 along the four longitudinal corners of the kit. This corner-to-corner relationship (as distinguished from the usual edge-to-face relationship ordinarily resorted to in the construction of wooden containers or boxes) has the advantage of affording obtuse bends on the order of 135° for the steel strapping material S (FIG. 4) which is tensioned around the wooden casing to provide the aforementioned loops or bands 14. Otherwise, if the usual 90° bends in the strapping material were to be employed to accommodate an edge-to-face assembly of the boards, the high tension applied to the bands during application thereof would damage the relatively soft pine lumber which is employed in the interests of economy.

The above-described grain door kit 10 lends itself to ease of bench assembly at the factory, the assembly procedure being schematically illustrated in FIG. 4. To effect the assembly, the two kraft sheets 30 are initially coiled to their involute tubular form and stapled as previously described to the respective pry-boards 42. The coiling operation is effected so that the waxed sides of the sheets face radially outwardly. Thereafter, one of the thus secured units 30, 42 and one of the climb-out boards 40 are lightly nailed or "tacked" to the two cleats 12 to produce the five-element assembly shown in FIG. 4 wherein the wooden components establish a coherent and generally L-shaped trough-like structure or sub-assembly with closed ends. If desired, the flexible container 50 with its supply of nails 36 may be pre-positioned within the confines of the rolled sheet 30 of the sub-assembly, or it may be inserted into the other rolled sheet immediately prior to application of its attached pry-board to the trough-like sub-assembly. This latter placement step is performed by juxtapositioning the loosely pre-assembled roll 30 and pry-board 42 against the sub-assembly so that the two rolls 30 assume a tangential relationship within the confines of the thus established U-shaped wooden structure. Thereafter, the last climb-out board 40 is positioned, but not nailed, in place on the two cleats 12 to complete the enclosure. The quadrilaterally arranged boards 40, 42 are then strapped by conventional strapping equipment to complete the assembly of the kit. Suitable seals such as are shown at 62 may be applied to the overlapping ends of the steel or other loops or bands 14 to maintain band tension.

The recesses 58 at the ends of the kit facilitate opening of the kit with an impact tool such as a hammer, it being necessary merely to sever the strapping material of the bands 14 to release the two loose boards 40 and 42 and separate the other two boards with light blows of the hammer or, alternatively, by manually prying the boards apart against the light holding action of the nails. The package is held in its assembled relationship largely by the tension in the strapping material rather than by the nails 56 which are few in number and which are used only as a "tacking" procedure to establish the five-piece assembly as previously described.

The assembly procedure, utilizing the present kit to supply the necessary components for both doors of a freight car has been partially illustrated in FIG. 1 wherein the dotted line disclosure of the kit components represents those parts which have been removed from the kit and installed across one of the door openings 16, these installed components also being shown in full lines in their installed positions. The full line disclosure of components resting upon the floor 20 represents these parts which remain yet to be installed upon the other door opening (not shown) of the freight car.

It is to be noted that since one of the flexible panels 30 is pre-nailed or otherwise secured to an associated pry-board 42, the initial nailing of such pry-board in position across the door opening 16 immediately establishes the proper position for the floor flap 44, as well as insuring squareness of the remainder of the panel as the same is progressively applied to the door posts. Since the panels are maintained in a rolled condition within the kit, as distinguished from the usually folded door panels, no fold or crease lines are present in the erected door panel and the creation of subsequent splits in the panel are avoided.

One of the wooden cleats 12 is shown as being nailed to the medial region of the installed climb-out board 40 on the inside thereof, the other cleat being reserved for nailing to the yet-to-be erected climb-out board when the second grain door installation is made. It is to be noted that one end cleat 12 is shown in FIG. 1 as being nailed to one of the pry-boards 40 in the medial region thereof. In this manner the effective width of the pry-board is increased in order to accommodate the width of the retaining notch which is associated with a conventional filling chute or funnel. The thus nailed cleat 12 affords a relatively thick anchorage region for the usual C-clamp which holds the loading spout in position during freight car loading operations, as well as reinforcing the medial region of the climb-out board.

The invention is not to be limited to the exact arrangement of parts shown in the accompanying drawings or described in this specification as various changes in the details of construction may be resorted to without departing from the spirit of the invention. Neither is the invention to be limited to the precise bench assembly procedure described herein in connection with the disclosure of FIG. 4. Such procedure is merely exemplary of the most convenient one which has yet been developed for efficient kit assembly operations. Obviously the order of assembly of the kit components may be varied to suit the convenience of the operator.

We claim:

1. A composite elongated rectangular box-like grain door kit embodying the principal components requisite to this installation of two grain doors across the door openings of a railway freight car or the like and including two flexible rectangular retaining panels of a width commensurate with the width of a door opening, each panel having side edges for nailing to the opposed door posts at the sides of one of the openings, and a bottom flap for nailing to the floor of the freight car, two reinforcing pry-boards of a length commensurate with the width of a door opening and having end regions for nailing to said opposed door posts adjacent said floor, and two climb-out boards of a length commensurate with the width of a door opening and having end regions for nailing to the upper regions of the door posts, each pry-board being secured to a respective retaining panel in the immediate vicinity of its bottom edge flap so that the flap overhangs one longitudinal edge of the pry-board, said boards being disposed in approximate edge-to-edge contiguity and establishing an elongated quadrilateral open-ended tubular structure wherein the pry-boards with their attached panels are adjacent each other in the tubular structure and the climb-out boards also are adjacent each other in the tubular structure, and a pair of rectangular hexahedral wooden cleats disposed within the confines of the tubular structure adjacent the opposite ends thereof, and means for clamping the end regions of each board to said cleats, said panels being individually coiled in involute fashion to provide two tubular rolls and being disposed entirely within the confines of said tubular structure and in substantial tangential relationship.

2. A composite elongated rectangular box-like grain door kit as set forth in claim 1, wherein said clamping means comprises a series of longitudinally spaced retaining straps extending around said tubular structure under tension and serving to draw the inside faces of said boards hard against said end cleats.

3. A composite elongated rectangular box-like grain door kit as set forth in claim 2, wherein the quadrilaterally disposed boards have their inside corner edges disposed in substantial contiguity, thus establishing a series of four longitudinally extending recesses which extend coextensively along the four longitudinal corner regions of the tubular structure whereby each tensioned strap is thus caused to span each recess with direction changes on the order of 135°.

References Cited

UNITED STATES PATENTS

| | | |
|---|---|---|
| 1,766,317 | 6/1930 | Wheless. |
| 1,861,294 | 5/1932 | Bartlett. |
| 1,879,157 | 9/1932 | Foshee. |
| 2,730,259 | 1/1956 | Frick _____ 217—66 |
| 3,079,986 | 3/1963 | Ford. |
| 3,149,664 | 9/1964 | Keating. |

WILLIAM T. DIXON, Jr., *Primary Examiner.*

U.S. Cl. X.R.

160—368